United States Patent [19]

Ruget

[11] 3,713,519
[45] Jan. 30, 1973

[54] ELECTROMAGNETIC CLUTCHES

[76] Inventor: Gabriel Ruget, 7 Cours Fauriel, Saint-Etienne, France

[22] Filed: Dec. 9, 1970

[21] Appl. No.: 96,471

[30] Foreign Application Priority Data

Dec. 10, 1969 France..................6942612
Nov. 10, 1970 France..................7041454

[52] U.S. Cl. .......................... 192/53 D, 192/84 A
[51] Int. Cl. ..................... F16d 23/06, F16d 27/09
[58] Field of Search........... 192/53 B, 53 D, 84 A, 65

[56] References Cited

UNITED STATES PATENTS

| | | | |
|---|---|---|---|
| 2,912,088 | 11/1959 | Breyer | 192/53 D |
| 3,057,447 | 10/1962 | Peras | 192/84 A X |
| 776,404 | 11/1904 | Keyser | 192/53 B |
| 1,712,190 | 5/1929 | Yates | 192/53 B |
| 1,755,769 | 4/1930 | Carhart | 192/53 B |
| 2,807,343 | 9/1957 | Ryder et al. | 192/53 B |

*Primary Examiner*—Allan D. Herrmann
*Attorney*—Irving M. Weiner

[57] ABSTRACT

An electromagnetic clutch comprising a rotor fast on a shaft and incorporating a coil and provided with axially directed teeth for engagement with corresponding teeth on a plate rotatable relative to the shaft, the rotor or plate being axially movable of the shaft. There is provided a means for substantially equalizing speeds of rotation of the rotor and plate so that the clutch can be engaged while running. Such means may be an intermediate disc or complementary formations on the rotor and plate.

7 Claims, 14 Drawing Figures

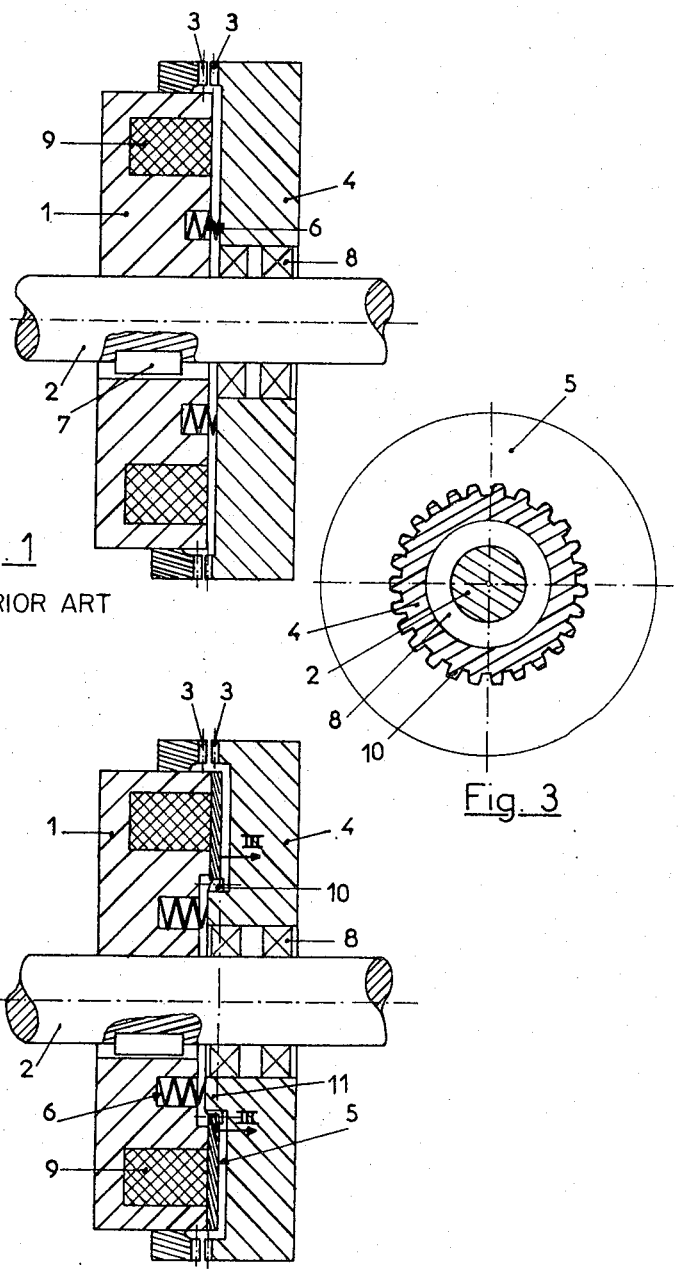

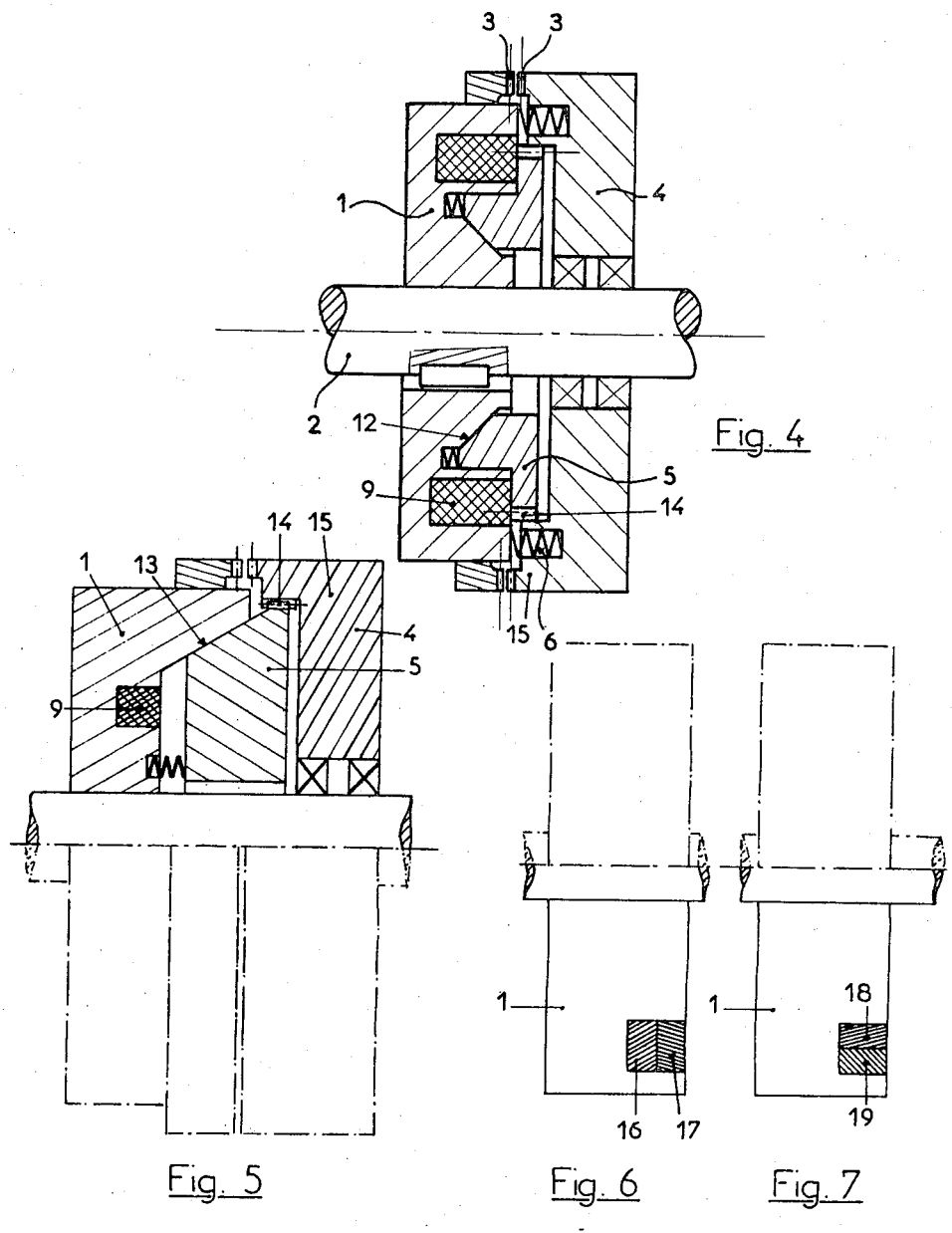

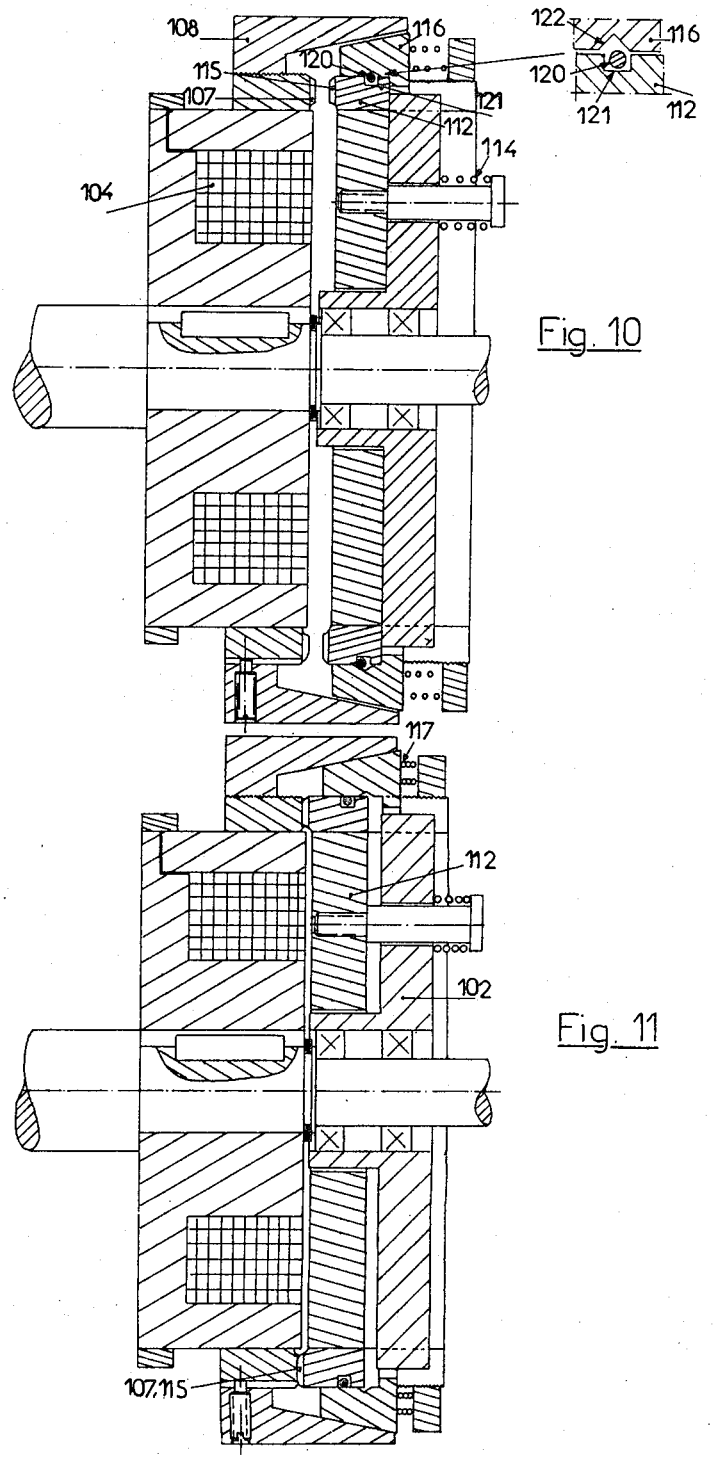

ELECTROMAGNETIC CLUTCHES

This invention relates to a synchronization device intended for an electromagnetic toothed clutch.

In electromagnetic toothed clutches of known type, there is provided a rotor keyed on a rotating shaft; opposite this rotor, rotating loosely on the same shaft, is a plate provided with axially-directed toothing which is opposite similar toothing on the rotor. Either the rotor or plate may slide on the shaft. Under these conditions, when the coil of the rotor is energized, the latter draws closer to the plate and the two sets of teeth engage to engage the clutch.

The main disadvantage of this type of clutch is that the engagement can only take place during a stoppage, or when the relative difference between the rotation speeds of the rotor and of the plate is relatively small.

An object of the present invention is to obviate or mitigate this disadvantage by providing a toothed electromagnetic clutch with which there is incorporated a synchronization device which makes it possible to equalize the rotational speeds of the rotor and of the plate before throwing them into gear, such that the engagement can be carried out while running.

SUMMARY OF THE INVENTION

The present invention provides an electromagnetic toothed clutch including a shaft mounted for rotation about its longitudinal axis, and a rotor mounted on the shaft so that the rotor rotates with the shaft. There is also included a plate mounted on the shaft to freely rotate around the shaft and to move axially relative to the longitudinal exis of the shaft. An electric coil is disposed in the rotor, and a plurality of teeth is disposed around the periphery of the rotor in an axial direction of the shaft toward the plate. A female conical ring is adjustably secured to and disposed around the periphery of the rotor to rotate therewith. An armature is disposed between the rotor and the plate, the armature being mounted for axial movement relative to the longitudinal axis of the shaft. Tenons extending through the plate into the armature connect the armature to the plate so that the armature will rotate with the plate, the tenons being slidably received in the plate. Springs are disposed between the tenons and the plate to bias the armature against the plate. A plurality of teeth are disposed around the periphery of the armature in an axial direction of the shaft toward the teeth disposed around the rotor, the teeth being adapted to engage each other. A male conical ring is disposed around the periphery of the armature and is affixed thereto for rotation therewith. The male conical ring is adapted to engage with the female conical ring. A skirt extends axially of the shaft from the periphery of the armature in a direction away from the rotor. A support ring is disposed around the periphery of the skirt projecting radially outwardly from the skirt. At least one calibrated spring is compressed between the male conical ring and the support ring biased to force the male conical ring into the female conical ring.

A toothed electromagnetic clutch according to the invention comprises a rotor rotationally fast with a rotating shaft, and a plate which rotates freely on this shaft, the rotor or plate being slidable on the shaft, and the clutch being characterized in that when the rotor coil is energized it is effected in two phases of increasing value so as to actuate the rotor and the plate provided with corresponding sets of opposed teeth, a friction element slidable on the shaft and rotationally fast with the plate being arranged so as to be attracted by the rotor during the first phase of the engagement process, in order to cause synchronization of the rotor and the plate before the latter and its toothing are in turn attracted into mesh of the rotor teeth during the second stage of the engaging process.

The friction means may be comprised of a disc of magnetic material, interposed between the plate and the rotor, and adapted to be attracted by the rotor coil while it is rotationally integral with the plate.

The friction means may alternatively be constituted, on the one hand, by a friction ring in the shape of a truncated cone rotationally fast with the periphery of the plate and adapted to engage a complementary ring rotationally integral with the periphery of the shaft driving the rotor, one of these rings being, moreover, capable of sliding axially relative to its support, plate or driving shaft, against the action of calibrated springs which tend to push the two conical rings into abutment against each other, whereas the rotor coil is supplied with voltage at least on two scales of intensity of increasing values.

A retractable abutment device may be located between the movable ring with its springs and its support, rotor rotating shaft or driving shaft.

The pole piece is not rotationally integral with the driving shaft on which it thus rotates freely. This makes it possible, in particular, to use a stationary rotor, whereas the corresponding conical ring rotates with the driving shaft.

A rotor integral in rotation with the driving shaft may be employed in which case the ring of the driving shaft may be provided directly on the periphery of the rotor.

A feature of the invention consists in using teeth located on the opposing faces of the armature and the rotor or the driving shaft, the meshing of which occurs when the rotor coil is energized at the greater intensity.

Another possible feature of the invention consists of interposing the armature between the plate and a rotor integral with the driving shaft. Teeth are located on the opposing faces of the armature and at the rotor. Springs tend to separate the plate from the armature in order to engage the two opposing sets of teeth, such that this engagement of teeth takes place when the rotor coil is no longer supplied with current.

In the first case (engagement due to the current) the supply of current with reduced intensity to the coil has the effect of attracting the plate and of engaging the two conical rings in order to ensure synchronization. Consequently, the excitation with full intensity after the equalization of the speed of rotation of the plate and of the driving shaft, has the object of putting the two sets of teeth in contact. Possibly, in a third stage, the coil may be supplied at a lesser intensity; in fact, after the engagement of the two sets of teeth, the airgap being very reduced, the force of contact of the two sets of teeth is still sufficient to transmit the required torque.

In the second case (engagement of the teeth due to a lack of current) one begins by supplying the coil with a slight current in order to ensure the disengagement, then a greater intensity is sent in order to ensure synchronization and finally, the current is cut in order that the teeth come into contact.

Naturally, in one or the other of the variations which have been described, the plate may equally well be provided with a male or female conical mounting, the driving shaft or the rotor thus being provided with a corresponding female or male mounting.

In the drawings:

FIG. 1 is an axial section through a toothed electromagnetic clutch of known type.

Embodiments of the present invention will now be described, by way of example, with reference to the accompanying drawings, in which:

FIG. 2 is an axial section through a synchronization clutch according to the present invention;

FIG. 3 is a section on the line III—III of FIG. 2;

FIG. 4 is an axial section of a modified clutch where the support surface of the intermediate disc is conical, located inside the coil of the pole piece;

FIG. 5 is an axial section of yet another modified clutch where this conical surface is placed outside the coil;

FIG. 6 is a diagrammatic view of a variation in which two coupled coils of the same diameter are used;

FIG. 7 shows diagrammatically a further variation in which the two coupled coils are one inside the other;

FIG. 10 is a variation of FIG. 8, showing a retractable abutment device located between the armature and the male conical ring, the clutch being in the disengaged position;

FIG. 11 shows the same clutch as in FIG. 10, but in the position for engagement of the teeth;

Figure 8:
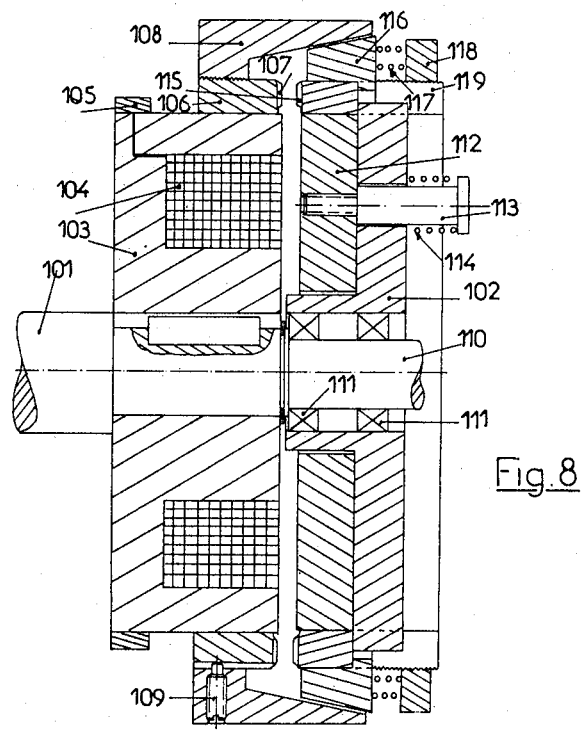
FIG. 8 is an axial section of a toothed clutch with synchronization according to the invention, in the disengaged position, the coil not being excited.

There is shown in FIG. 1 a toothed electromagnetic clutch of known type. It comprises a rotor 1 containing an electromagnetic coil 9. This rotor 1 is fast on a rotating shaft 2 through the intermediary of a key 7. On the other hand, the rotor 1 is freely slidable axially on the shaft 2. It has on its periphery axially directed radial teeth 3. On the same shaft 2, supported by bearings 8, there rotates freely a plate 4 of magnetic material, which also has at its periphery axially directed teeth 3 identical to those of the rotor 1.

Compression springs 6 are housed between the rotor 1 and the plate 4 in order to separate them when the coil 9 is not energized.

It will be understood that when the coil 9 is energized, the rotor 1 and the plate 4 move towards each other, such that the teeth 3 are caused to mesh. When the coil 9 is de-energized the return springs 6 disengage the meshing teeth, thus separating the rotor 1 and the plate 4.

It will be seen that the engagement can be effected when the rotor 1 and plate 4 are rotating at substantially the same speed, for example, with a relative difference in rotation of less than 50 r.p.m.

On the other hand, there is shown in FIGS. 2 and 3 a toothed electromagnetic clutch according to the present invention. This clutch is characterized by the presence of an intermediate disc 5 interposed between the rotor 1 and the plate 4. This disc 5 is also of magnetic material. It is rotatable with the plate 4 by means, for example, of central channels or teeth 10 which enable it to slide axially on a grooved boss 11 provided for this purpose on the inner face of the plate 4.

Another feature of the invention consists in energizing the coil 9 by means of a device of known type (not shown) providing a two phase supply.

In a first supply phase, a reduced value of current is fed to the coil 9, which causes attraction of the disc 5 against the rotor 1. The resulting friction tends to lead to equality in the speeds of rotation of the rotor 1 and the plate 4.

In a second supply phase, the coil 9 is supplied with a normal intensity of current, sufficient to compress the springs 6 and attract the rotor 1 against the plate 4, which ensures the engagement.

It will be noted that in the example illustrated in FIGS. 2 and 3, the springs 6 act directly on the boss 11 of the plate 4, that is to say, the intermediate disc 5 is not subjected to their action.

FIG. 4 shows another variation in which the intermediate disc 5 has a support surface in the shape of a truncated cone which ensures braking and the synchronization whilst abutting against a complementary surface of the rotor 1, when the coil 9 is energized. In the example of FIG. 4, the surface 12 in the shape of a truncated cone is housed radially inwardly of the coil 9, the apex of the cone being directed towards the plate 4.

On the other hand, in the variation of FIG. 5, the support face in the shape of a truncated cone 13 of the intermediate disc 5 is located radially outwardly of the coil 9, the apex of the cone being directed towards the rotor 1.

In FIGS. 4 and 5, the intermediate disc 5 has a peripheral toothing 14 which enables it to slide in a longitudinal direction relative to additional toothing cut inside a peripheral ring 15 of the plate 4.

The clutch engagement may be effected in two stages according to FIG. 6 or FIG. 7.

In FIG. 6, there is incorporated with the rotor 1, two coupled coils 16 and 17 of the same diameter. One of them serves to attract the intermediate disc 5 in order to obtain the synchronization, while the other is energized to engage the rotor 1 on the plate 4.

In the case of FIG. 7, there is provided two coils 18 and 19 placed in the same transverse plane, one inside the other.

There is shown in FIG. 8 a toothed electromagnetic clutch interposed between a driving shaft 101 and a driven plate 102. On the driving shaft 101 there is keyed a rotor 103 which houses an electric coil 104 which may be energized from a rotating ring 105. The periphery of the rotor 103 is integral with a ring 106 provided with a axially directed toothing 107. Moreover, this ring 106 is surrounded by a female conical ring 108 with which it is connected. This ring 108 is preferably screwed on to the ring 106, which makes it possible to adjust their relative positions axially. A clamping screw 109 secures the assembly of rings 106 and 108 after adjustment.

The driving shaft 101 is extended by a section 110 on which bearings 111 support the plate 102 which may rotate freely. Between this plate 102 and the rotor 103 is located a disc or armature 112 of the clutch. This disc 112 may slide in the axial direction relative to the plate 102 with which it is rotationally integral by means of tenons 113.

The compression springs 114 pull the disc 112 against the plate 102.

The periphery of the disc 112 is provided with a axially directed toothing 115 able to engage with the toothing 107 of ring 106 mounted around the periphery of the rotor 103. Finally, a friction means, such as, a male, conical ring 116, is rotationally integral with the periphery of the disc 112 which it surrounds. Calibrated springs 117 are compressed between the ring 116 and a threaded support ring 118 which is screwed onto a notched peripheral skirt 119 on the disc 112. Clamping means (known per se and not shown) make it possible to immobilize the ring 118 relative to the disc 112, after adjusting the calibration of the springs 117.

In this embodiment, it is assumed that the excitation coil 104 is supplied by an insulated ring 105 and by the rotor, but it could also be supplied by two insulated rings.

In the embodiment illustrated in FIGS. 10 to 11, there is provided a retractable abutment device between the periphery of the disc or armature 112 and the movable ring 116. This device is constituted, for example, by a split metallic ring 120, retained in a groove 121 located on the outer diameter of the disc 112. In the disengaged position, this ring 120 engages in a biconical groove 122 located on the lower bore of the male conical 116.

In the engaged position, the ring 120 no longer penetrates the biconical groove 122.

The operation is as follows:

While the driving shaft 101 rotates, the clutch remains disengaged as long as the coil 104 is not supplied with current (in the case of FIGS. 8 and 10).

In order to throw it into engagement, one begins by sending into the coil 104, a current of intensity $I_1$: the rotor 103 attracts the disc or armature 112 which takes with it the male conical ring 116. As soon as the latter comes into contact with the female ring 108, the displacement of the disc 112 stops, either due to the calibrated resistance of the spring 117 (in the case of FIG. 8) or due to the ring 120 which abuts against the biconical groove 122 (in the case of FIG. 10). Finally, the two rings 116 and 108 are thus in contact with each other under a sufficient pressure for ensuring the synchronization without the teeth 107 and 115 being interlocked.

Then the coil 104 is supplied with a current of intensity $I_2$, greater than $I_1$. The force of attraction thus exerted on the disc or armature 112 is sufficient to compress the springs 117 (FIG. 8) or overcome the resistance of the ring 120 which retracts in its groove 121 (FIG. 10). The teeth 107 and 115 thus interlock as far as the final engagement position, illustrated in FIGS. 9 and 11.

In order to disengage the clutch one cuts off the electrical supply to the coil 104, under the action of the springs 114, the disc 112 comes against the plate 102 and the springs 117 return the male ring 116 to its initial position (FIGS. 8 and 10). In the case of the variation of FIGS. 10 and 11 the compression force of the springs 117 is appreciably less than that of the springs 117 of FIGS. 8 and 9.

Figure 12:
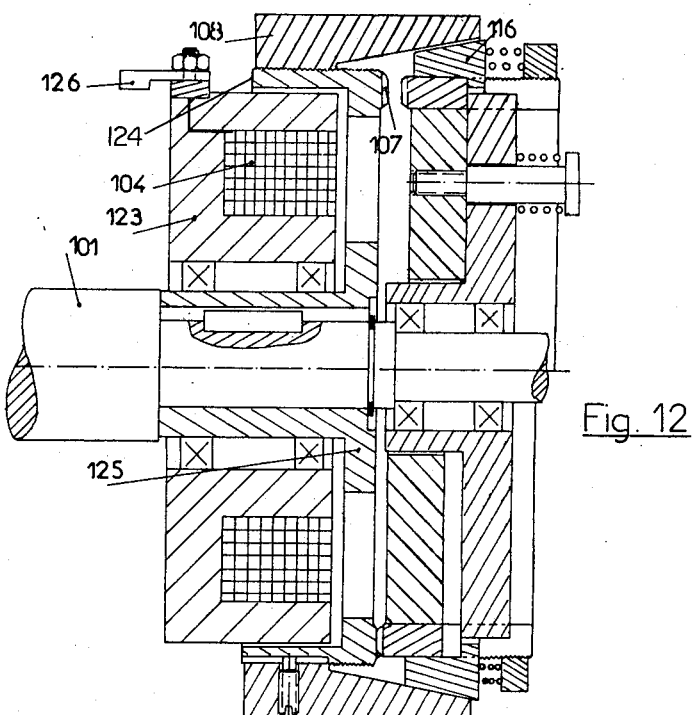
FIG. 12 is a variation of FIG. 8 in which the rotor in not integral in rotation with the driving shaft (it is stationary), the upper half of the Figure showing the disengaged clutch, and the lower half the engaged device.

In the embodiment shown in FIG. 12, a stationary rotor 123 is centered on the driving shaft 101 by ball bearings. In a variation, it may be centered by any other support connecting it to the frame. An intermediate part 124 supports the female ring 108 and the teeth 107. The coil 104 is directly connected to two terminals, one of them being replaceable by the rotor.

Figure 13:
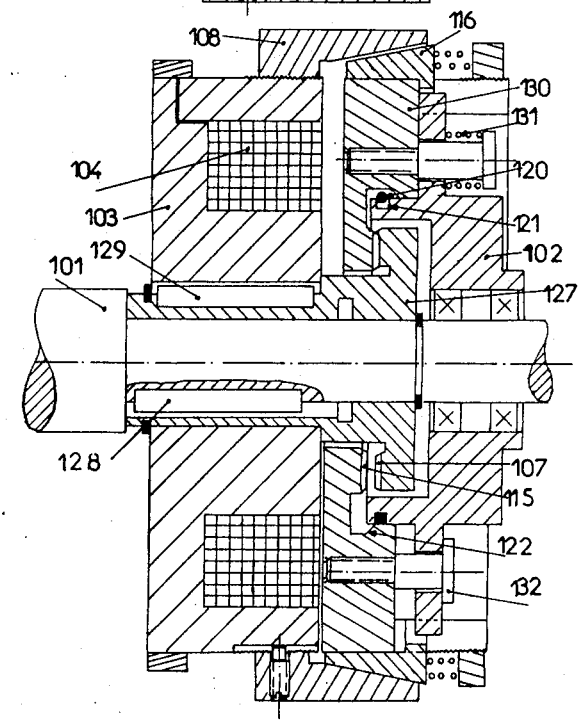
FIG. 13 is a variation of FIG. 8 showing a clutch with engagement of the teeth due to a lack of current, in the engaged position for the upper half of the Figure, and the disengaged position for the lower half.

In FIG. 13, there is shown a clutch, whose teeth 107 and 115 are interlocked when the excitation coil 104 receives no current.

A sleeve 127, prevented from displacing on the driving shaft 101, is integral in rotation both with this shaft by means of a key 128 and with the rotor 103 by means of a key 129. It supports the teeth 107.

The above-described, retractable abutment system is used between an armature 130 and the plate 102. The ring 120 is retained in the groove 121 located on the plate 102.

The abutment effect is obtained by the conical face of the groove 122 located on the armature.

For a current of intensity $I_1$ in the excitation coil, depending on the calibration of the springs 131 pressing the teeth 115 of the armature 130 against the teeth 107 of the sleeve 127, the armature 130 is partially attracted by the rotor 103 into a position in which it disengages its teeth 115 from those of the sleeve and in which the male ring 116 which it supports is no longer in contact with the female ring 108 of the rotor 103: the clutch is thus in a disengaged position.

This disengaged position is kept stable by the action of the conical groove 122 abutting against the ring 120 and preventing the displacement of the armature towards the rotor 103.

If the driving shaft 101 rotates while the plate 102 is stationary, for an intensity $I_2 > I_1$, of the excitation current of the coil 104, the armature 130 is thus attracted to the point where the male ring is applied against the female ring with the necessary force for ensuring the synchronization of the plate 102 and of the driving shaft 101 in a given time. In this position (lower half of FIG. 13) the ring 120 retracts from the conical groove 122. An adjustable abutment 132 prevents the armature from coming in contact with the rotor. Since the synchronization has been effected, the excitation of the coil 104 is cut and the armature 130, pulled back by the calibrated springs 131, interlocks its teeth 115 with the teeth 107 of the sleeve 127, thus terminating the engagement cycle.

Figure 9:
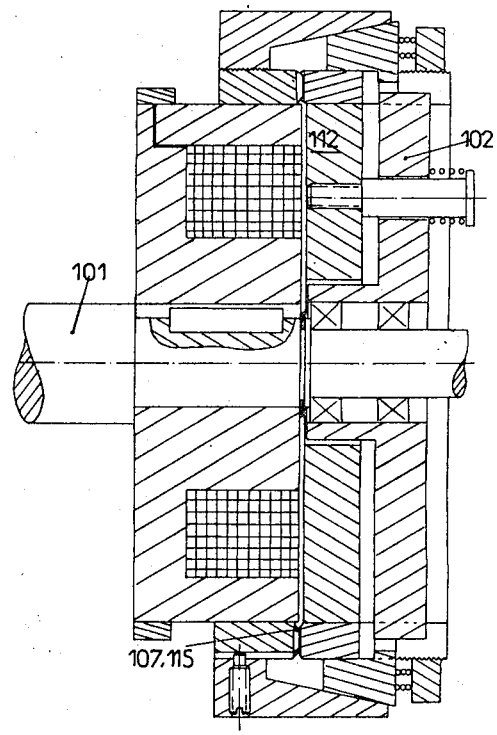
FIG. 9 shows the clutch of FIG. 8 in the engaged position, the teeth being in contact.
Figure 14:
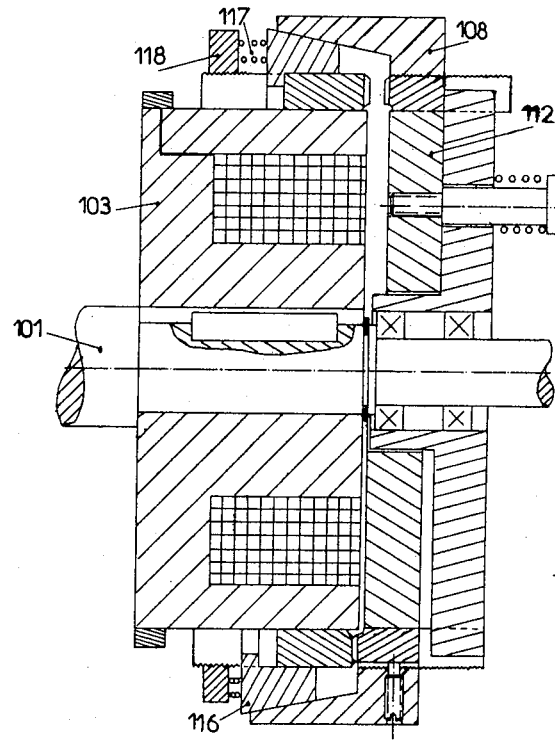
FIG. 14 shows a variation in which the female conical ring is supported by the plate.

There is shown in FIG. 14 a variation corresponding to the arrangement of FIGS. 8 and 9, but with inversion of the rings in the shape of truncated cones. Here, it is the rotor 103 which supports the male ring 116 in the shape of a truncated cone, which can be displaced relative to the abutment ring 118 by compressing the return springs 117. This abutment ring 118 is supported by the rotor 103.

On the other hand, the conical, female ring 108 is integral with the periphery of the armature 112 on which it is immobilized by the screw 109 in an adjustable position.

Naturally, this inversion of the relative positions of the male and female conical rings may also be used on the variations of the other FIGS. 3 to 6.

What is claimed is:

1. An electromagnetic toothed clutch, comprising:
a shaft mounted for rotation about its longitudinal axis;
a rotor mounted on said shaft so that said rotor rotates with said shaft;
a plate mounted on said shaft to freely rotate around said shaft and to move axially relative to the longitudinal axis of said shaft;
an electric coil disposed in said rotor;
a plurality of teeth disposed around the periphery of said rotor in an axial direction of said shaft towards said plate;
a female conical ring adjustably secured to and disposed around the periphery of said rotor to rotate therewith;
an armature disposed between said rotor and said plate, said armature being mounted for axial movement relative to the longitudinal axis of said shaft;
tenons extending through said plate into said armature to connect said armature to said plate so that said armature will rotate with said plate, said tenons being slidably received in said plate;
springs disposed between said tenons and said plate to bias said armature against said plate;
a plurality of teeth disposed around the periphery of said armature in an axial direction of said shaft toward said teeth disposed around said rotor, said teeth being adapted to engage each other;
a male conical ring disposed around the periphery of said armature and being affixed thereto for rotation therewith, said male conical ring being adapted to engage with said female conical ring;
a skirt extending axially of said shaft from the periphery of said armature in a direction away from said rotor;
a support ring disposed around the periphery of said skirt projecting radially outwardly from said skirt; and
at least one calibrated spring compressed between said male conical ring and said support ring biased to force said male conical ring into said female conical ring.

2. An electromagnetic clutch as defined in claim 1, wherein said teeth around the periphery of said rotor are formed in a ring which is disposed around the periphery of said rotor.

3. An electromagnetic clutch as defined in claim 1, wherein said rotor is keyed to said shaft.

4. An electromagnetic clutch as defined in claim 1, wherein threads are disposed around the periphery of said skirt;
threads are disposed around an interior circumference of said support ring; and
said threads disposed around said skirt and said support ring are adapted to mate with each other such that said support ring is adjustably located on and secured to said skirt.

5. An electromagnetic toothed clutch as defined in claim 1, wherein said electric coil has at least two levels of intensity such that when a supply of lower intensity voltage is supplied to said coil said armature is attracted toward said rotor forcing said male conical ring into engagement with said female conical ring to insure synchronization, and when supplied with an electrical voltage of higher intensity after equalization of the speeds of rotation of said plate and said rotor has been achieved, said armature is further attracted toward said rotor until said teeth in said rotor are meshed with said teeth in said armature.

6. An electromagnetic clutch as defined in claim 1, including a retractable abutment device disposed between said armature and said male conical ring comprising:
means defining a groove around the periphery of said armature;
means defining a biconical groove disposed around an inner circumference of said male conical ring; and
a split metallic ring disposed in said means defining said groove in said armature, the diameter of said split ring being such that a portion of said split ring engages in said means defining said biconical groove when said means defining said groove in said armature is aligned with said means defining said bi-conical groove in said male conical ring.

7. An electromagnetic clutch as defined in claim 6, wherein said electric coil which has at least two levels of intensity such that when a supply of a lower intensity voltage is supplied to said coil said armature is attracted toward said rotor forcing said male conical ring into engagement with said female conical ring to insure synchronization, and when supplied with an electrical voltage of higher intensity after equalization of the speeds of rotation of said plate and said rotor has been achieved, said armature is further attracted toward said rotor until said teeth in said rotor are meshed with said teeth in said armature.

* * * * *